United States Patent [19]

Mathis et al.

[11] Patent Number: 4,737,600

[45] Date of Patent: Apr. 12, 1988

[54] REENTERABLE SPLICE CLOSURE METHOD AND APPARATUS

[75] Inventors: Michael G. Mathis, Lawrenceville, Ga.; William H. Fuller, Vicksburg, Miss.

[73] Assignee: Sigmafor Corporation, Sunnyvale, Calif.

[21] Appl. No.: 878,028

[22] Filed: Jun. 24, 1986

[51] Int. Cl.[4] ............................................. H02G 15/08
[52] U.S. Cl. ..................... 174/87; 174/74 A; 174/77 R; 174/91; 174/DIG. 8
[58] Field of Search ............... 174/38, 74 A, 77 R, 174/87, 91, DIG. 8

[56] References Cited

U.S. PATENT DOCUMENTS

| | | | |
|---|---|---|---|
| 3,395,382 | 7/1968 | Weagant | 174/72 R |
| 3,614,295 | 10/1971 | Gillemot | 174/87 |
| 3,710,003 | 1/1973 | Channell | 174/77 R |
| 3,848,074 | 11/1974 | Channell | 174/77 R X |
| 4,399,602 | 8/1983 | Hancock et al. | 174/74 A |
| 4,468,536 | 8/1984 | Van Noten | 174/DIG. 8 X |

FOREIGN PATENT DOCUMENTS 3329904  3/1985  Fed. Rep. of Germany ........ 174/91

Primary Examiner—Morris H. Nimmo
Attorney, Agent, or Firm—Limbach, Limbach & Sutton

[57] ABSTRACT

A reenterable splice closure and method of making and applying the same is disclosed having a pair of mating housings with an internal rigid telescoping support collar located at the seam between the two housings, and a first heat shrinkable sleeve surrounding and sealably shrunk down over the mating ends of the housings sealing the seam and extending the end of one housing for heat shrinking down onto cables leading from a splice enclosed in the housing. The enclosure can be reopened by cutting the splice along a line over the seam, and after the closure has been reassembled with the housings again in mating position, a new heat shrinkable sleeve is applied down over the cut in the first shrinkable sleeve.

24 Claims, 3 Drawing Sheets

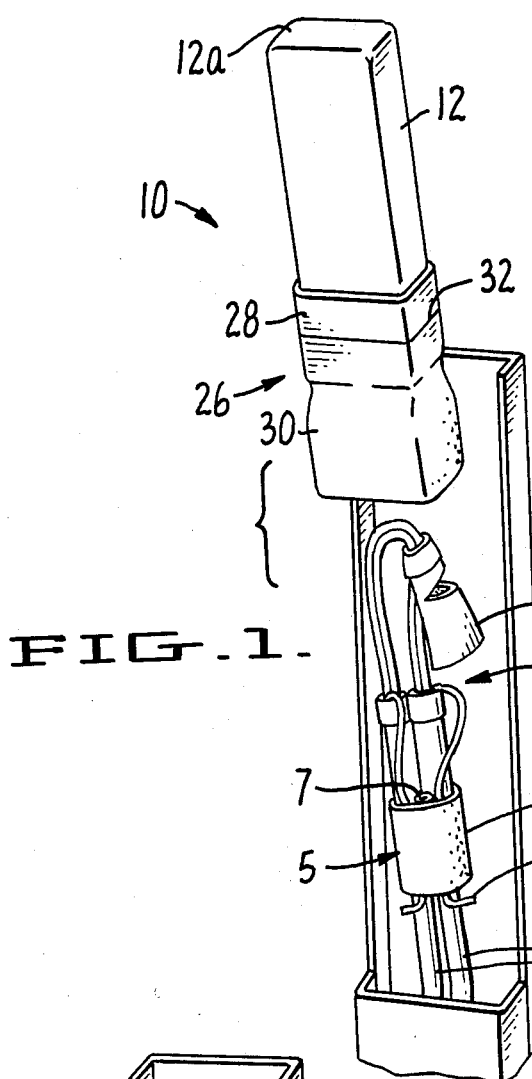
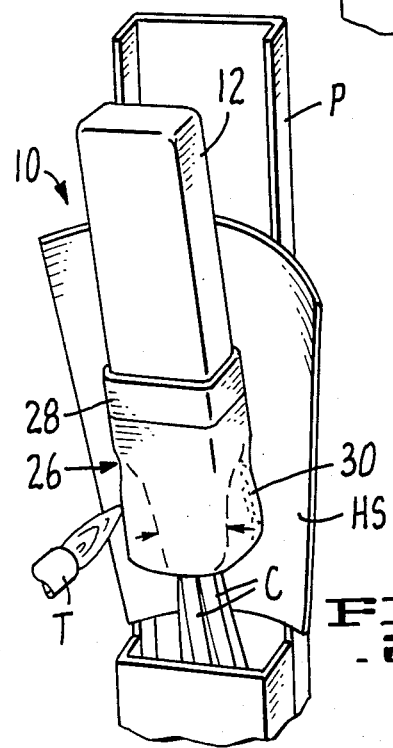
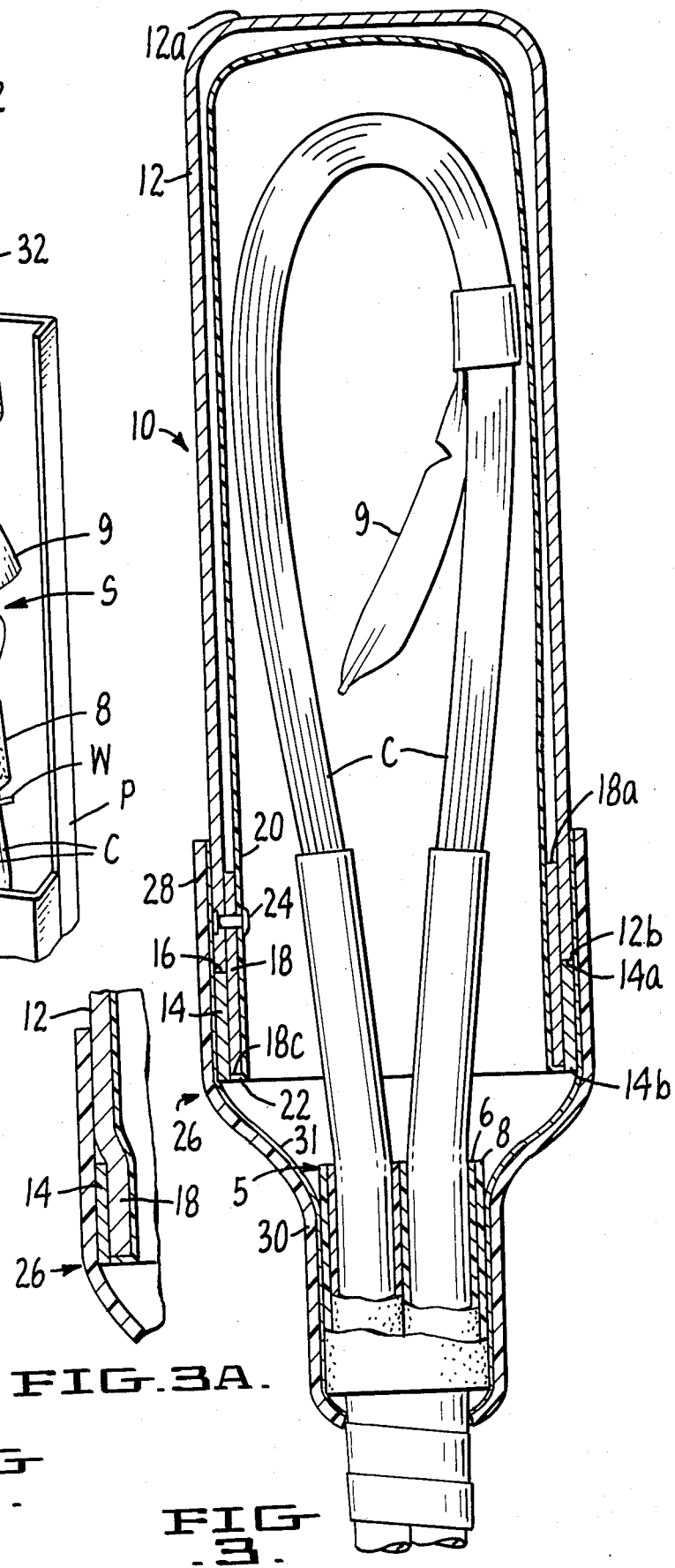
FIG. 1.
FIG. 2.
FIG. 3A.
FIG. 3.

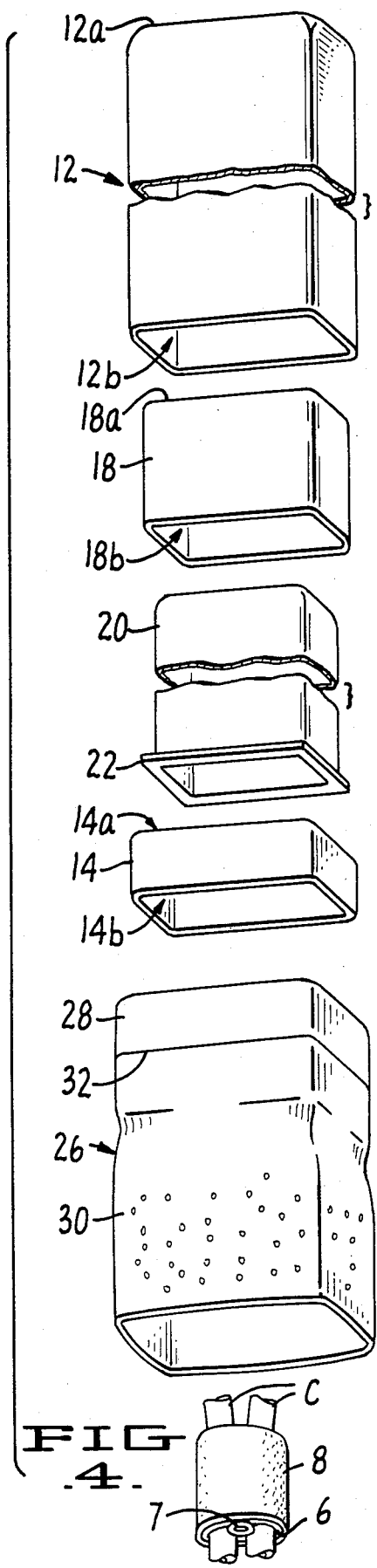
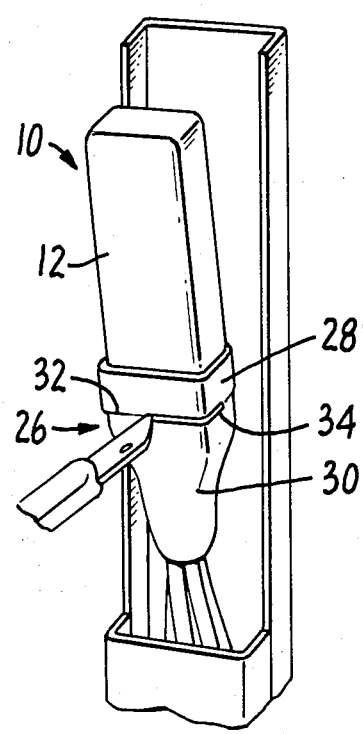
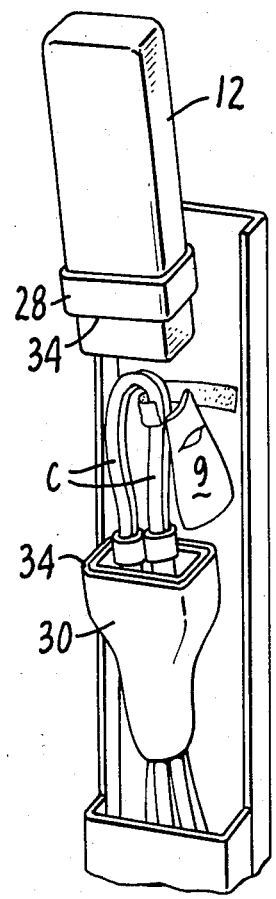
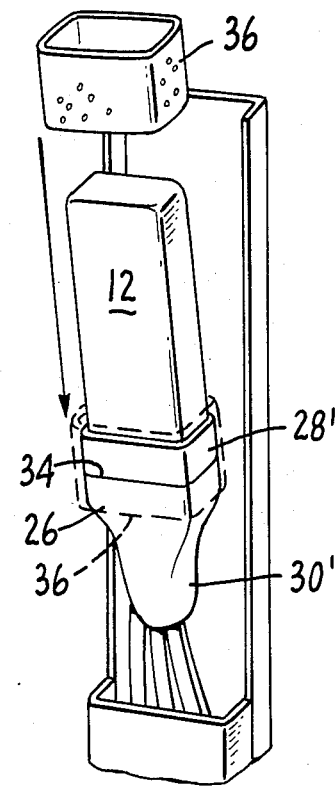
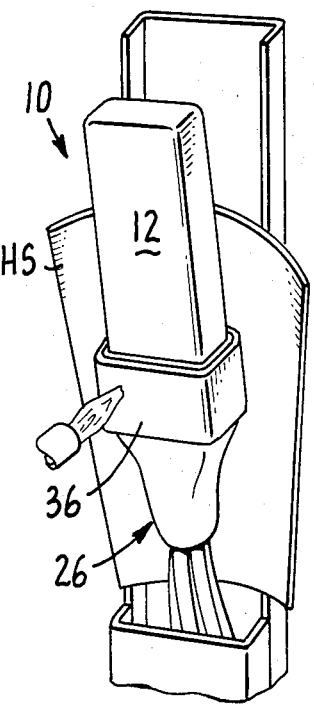

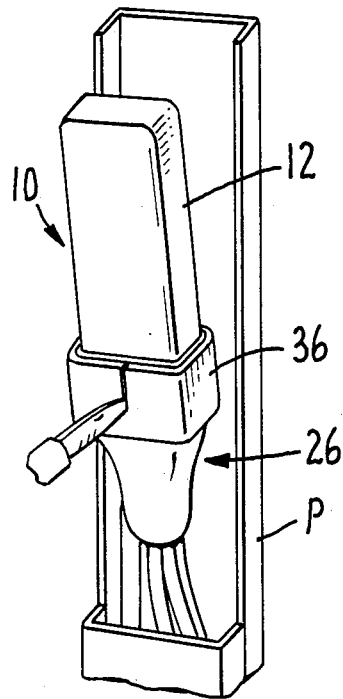
FIG. 6A.
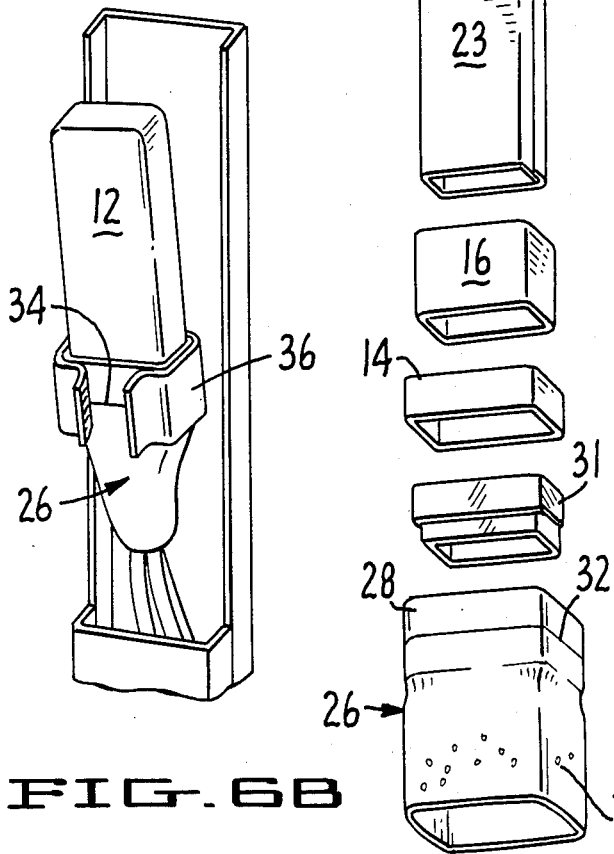
FIG. 6B
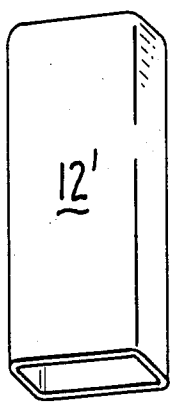
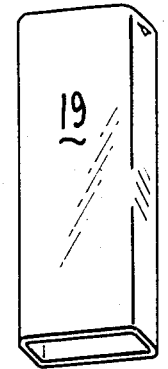
FIG. 7.
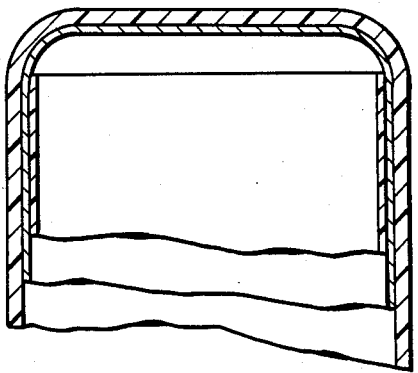
FIG. 8.

REENTERABLE SPLICE CLOSURE METHOD AND APPARATUS

BACKGROUND OF THE INVENTION

The present invention relates in general to reenterable enclosure systems and more particularly to a reenterable splice closure for electrical cables easily reentered and resealed in the field with a minimum number of parts and effort.

Over the years various designs for reenterable splice closures have been proposed and marketed. One such closure is disclosed in U.S. Pat. No. 3,395,382 having a lower housing with a plurality of heat shrinkable entry legs at one end and adapted at the other end to be sealably connected, such as by threads, with an "0" ring seal, to a closure cap. This reenterable housing is fairly costly to manufacture and is not readily adaptable for use with cables of a wide variety of sizes.

SUMMARY OF THE INVENTION

Broadly stated, the present invention is directed to a reenterable splice closure and method of making and applying same wherein the enclosure includes a pair of mating housings with a rigid telescoping support collar located at the seam between the two housings and with a first heat shrinkable sleeve surrounding and sealably shrunk down over the mating ends of the housings sealing such seam and extending beyond the end of one housing for heat shrinking down onto the cables leading from the splice to be enclosed. The collar serves as a rigid, already in place, support to withstand radial inward pressure resulting when the first heat shrinkable sleeve is cut along the seam, the housing opened and then reclosed and a second heat shrinkable sleeve shrunk down over the cut of the first heat shrinkable sleeve radially outward of the collar.

One feature and advantage of the present invention is that the splice closure can easily be applied initially to sealably enclose a splice in the field merely by placement of the enclosure over the splice and shrinkage of the free extending end of the first heat shrinkable sleeve onto the cables projecting out of the enclosure. The splice closure is a single completely assembled unit so that no parts need be assembled in the field.

If the closure ever need be reentered, the first heat shrinkable sleeve is merely cut at the mating seam between the two housings and the closure opened up without destroying the integrity of the seal between the first heat shrinkable sleeve and the cables of the splice. After the splice has been operated upon, the housing members are reclosed and the second heat shrinkable sleeve is shrunk down over the cut in the first heat shrinkable sleeve at the mating seam of the housings. No additional support structure is necessary to add or utilize in order to accomplish the second seal.

In a preferred embodiment of the present invention, the housings and the collar of the sleeve are of rigid metal, typically aluminum, which serve as a nonpermeable barrier as well as structural support which withstand the radial inward pressure when the first heat shrinkable sleeve is applied to the housing during manufacture as well as when the second heat shrinkable sleeve is applied to reclose the housing after it has been reentered and reclosed in the field.

In accordance with another aspect of the present invention, the splice closure constructed of the metallic housings of the last aforementioned aspect of this invention includes a molded cup of insulating material positioned within the collar and covering at least the inside edge of the lower end of the collar, thereby both preventing damage or cutting of the sleeve when the metallic parts of the closure are reassembled after the entry as well as serving as electrical insulation between the splice and the metallic housing members.

In accordance with still another aspect of the present invention, the assembly is made so that the location of the seam between the mating housing members is clearly visible either by way of the deformation in the first heat shrinkable sleeve immediately over the seam between the housing members an/or by indicia placed on the first heat shrinkable sleeve at that location.

Other features and advantages of the present invention become more apparent upon a perusal of the following specification taken in conjunction with the accompanying drawings wherein similar characters of reference are used to refer to similar parts in each of the several views.

DESCRIPTION OF THE DRAWINGS

Fig. 1 is a perspective view of a reenterable splice closure ready for placement over an illustrated splice.

FIG. 2 is a view similar to Fig. 1 but with the closure placed over the splice and illustrating the application of heat to the heat shrinkable sleeve of the closure for shrinking and sealing onto the cables leading to the splice.

FIG. 3 is an elevational sectional view of a reenterable splice closure that has been sealed onto the cables for a splice.

FIG. 3a is a view illustrating an alternative construction for a portion of the structure shown in FIG. 3.

FIG. 4 is an exploded view of the parts making up the splice closure illustrated in FIG. 3.

FIGS. 5a–5d are perspective views illustrating the steps involved in opening, reentering, closing, and resealing the closure illustrated in FIG. 3.

FIGS. 6a and 6b are views illustrating the initial steps for again reentering and reclosing a reenterable closure that has once previously been reopened and reclosed as illustrated in FIGS. 5a–5d.

FIG. 7 is an exploded view of a part for a reenterable splice closure in accordance with still another embodiment of the present invention.

FIG. 8 is an elevational sectional view of the reenterable splice closure illustrated in FIG. 7.

DESCRIPTION OF THE PREFERRED EMBODIMENT

The preferred embodiment of the present invention is illustrated in FIGS. 1–6, first illustrating in FIGS. 1–4 the construction and initial use of the reenterable splice closure of the present invention, secondly illustrating in FIGS. 5a–5d the reentry and reclosing of the closure and insulation illustrated in FIGS. 1–4, and thirdly, in FIGS. 6a–b the reentry of the closure that has already once previously been reentered as illustrated in FIGS. 5a–5b.

Referring now FIGS. 1, 3 and 4, there is illustrated a reenterable splice closure 10 in accordance with the present invention for fitting within commercially available pedestals P placed above ground in the field for making above ground splices S between underground cables C and above ground cable wires. Wires W are spliced into the cables C and a sealant collar 5 is placed around the spliced cables C and wire W. Typically, this sealant collar is formed by placing a lap of tape sealant 6 around each cable C, placing rolled sealant 7 between the cables C and placing one lap of tape sealant 8 around the entire collar. A dessicant bag 9 is added to absorb moisture that is trapped in the closure when the closure is completed.

The closure 10 includes an upper rigid metallic housing member 12, such as of aluminum, having an upper closed end 12a and a lower open end 12b. The housing 12 is tubular in form, preferably rectangular in cross section for fitting in pedestal P. The closure 10 also includes a lower rigid metallic housing member 14 open at its upper and lower ends 14a and 14b, of the same cross sectional configuration as the upper housing 12 and with the upper end of the lower housing 14 and the lower end of the upper housing 12 mating at an external seam or joint 16.

Support structure telescoping between the upper and lower housings 12 and 14 is included which provides a support within the housing for radially inward directed forces at the seam 16. In the embodiment illustrated in FIGS. 3 and 4, this support structure is in the form of a tubular collar 18 of the same cross sectional configuration as the housings 12 and 14 but of lesser length and width in the case of a rectangular cross section member or lesser diameter in the case of a circular cross section member.

A molded cup shaped member of insulating material, such as a rigid polymer, is positioned within the collar 18 and extends upwardly into the upper housing member 12 and has a radially outwardly extended lip 22 at the open end of the cup 20 which covers the inside edge 18c of the lower end of the collar 18. The upper housing member 12, the collar 18, and the molded cup 10 are secured together such as by a rivet 24.

A first heat shrinkable sleeve 26 is provided with the upper portion 28 sealably shrunk down over the mating ends 12b and 14a of the upper and lower housing members 12 and 14, respectively and sealing the joint or seam 16. The lower sleeve portion 30, which is heat shrinkable and not previously heat shrunk, extends beyond the lower end of the lower housing member 14. Application of heat to the lower portion 30 of the first heat shrinkable sleeve 26 will cause that portion 30 to shrink radially inwardly and onto an object such as cables C extending out of the closure 10 through the lower end of the lower housing member 14. A nonpermeable sleeve 31, such as of aluminum foil, can be included within the lower portion 30 of the heat shrinkable sleeve 26.

A cut line 32 is marked on the outside of the sleeve 26 immediately over the seam 16 so once the sleeve 26 is cut along line 32 the closure can be reopened by telescopically removing the upper housing member 12 with the attached collar 18 and molded cup 20 from the lower housing member 26. Preferably the seam 16 is physically configured so that its location is apparent on the outside surface of the sleeve 26.

The reenterable splice closure is initially used in the manner illustrated in FIGS. 1 and 2.

After the splice is made and the sealant collar 5 provided around the cables C and spliced wires W, the closure 10 is projected down over the splices from the position initially shown in FIG. 1 to the position shown in FIG. 2. With a heat shield HS positioned between the closure and the pedestal P in the region of the lower portion 30 of the heat shrinkable sleeve 26, heat is applied to the heat shrinkable portion 30 such as by a torch T to cause the heat shrinkable portion 30 to shrink down over the sealant collar 5 thereby sealing the closure to the cables C and wires W. At this point, the reenterable closure 10 has been completed on the cables and the pedestal P can be closed with a cover (not shown).

At any time the closure 10 can be reentered and easily resealed utilizing only a second heat shrinkable sleeve. This procedure and structure is illustrated in FIGS. 5a–5d.

As shown in FIG. 5a, the first heat shrinkable sleeve 26 is cut at 34 along the line 32 over the seam 16 thereby freeing the structural connection between the upper housing 12 and the lower housing 14. The upper housing 12 is removed as shown in FIG. 5b. Once the splice S has been operated on in whatever manner desired, the upper housing member 12 is repositioned adjacent the lower housing member 14 by telescopically projecting the collar 18 into the lower housing member 14. A second heat shrinkable member 36 which, in expanded condition, is larger than upper housing 12 and typically includes an interior coating of sealant, such as a hot melt adhesive on the inside surface, is positioned down over the closure 10 at a location covering the cut 34 as shown in FIG. 5c. Heat is then applied to the heat shrinkable sleeve 36 to shrink it down over the first heat shrinkable sleeve 14 and seal the cut 34. The sleeve 36 physically connects and holds the upper and lower housings 12 and 14 together in a sealed manner. During the installation of the second heat shrinkable sleeve 36, the collar 18 supports the seam 16 between the housings 12 and 14 without the need for the addition of any parts or materials to the closure 10 other than the sleeve 36.

After the closure 10 has been first reentered and resealed in the manner described and illustrated with respective FIGS. 5a–5d, the closure can again be reentered and resealed in the manner illustrated in FIGS. 6a and 6b.

Referring to FIG. 6a, a splice closure 10 in accordance with the present invention which has once previously been reentered and resealed with a second heat shrinkable sleeve 36 over the cut 34 dividing the first sleeve 26 into the upper and lower portions 28' and 30', the second heat shrinkable sleeve 36 is cut longitudinally of the closure 10 and then peeled off of the first heat shrinkable member 26 as shown in FIG. 6b. The closure can then be opened, closed and resealed with another heat shrinkable sleeve 36 as shown in FIGS. 5b–5d.

There are other ways of constructing the closure from that illustrated with respect to the preferred embodiments and still falling within the scope of the present invention. For example, instead of having the collar 18 be a separate element secured to the upper housing 12, the upper housing 12 could be provided with a lower extension portion of lesser diameter that telescopically projects into the lower housing 14 as illustrated in FIG. 3a. Alternatively, the collar could be integral with the lower housing 14 and telescope within the upper housing 12.

When the closure 10 is placed down over the splice as shown in FIG. 2 or when the upper housing 12 is placed down over the splice going from FIGS. 5b to 5c, the lip 22 of the molded cup 20 prevents the lower sharp edge of the collar 18 from cutting or damaging the splice S or the cables that ultimately are contained within the closure after it is sealed.

Referring now to FIGS. 7 and 8, there is illustrated an alternative embodiment of the present invention. As shown there, the upper housing 12' is made of a rigid polymer shell material which projects down over the collar 18. Because the polymer material of the housing 12' is permeable, a nonpermeable barrier 19 such as an aluminum foil, in the form of a sock is positioned on the inside surface of the housing 12' and appropriately has its lower open end extended between the housing 12' and the collar 18. A protective liner 23 is provided inside the foil material 19 to protect against damage of the foil upon the removal and reclosure of the closure and also to serve as electrical insulation between the splice and the metal foil 19. The housing 12', nonpermeation barrier 19, collar 18, and protective liner 23 are secured together, such as by rivets. The closure illustrated in FIGS. 7 and 8 is utilized in the same fashion as the closure illustrated in FIGS. 1–6.

The terms and expressions which have been employed here are used as terms of description and not of limiations, and there is no intention, in the use of such terms and expressions, of excluding equivalents of the features shown and described, or portions thereof, it being recognized that various modifications are possible within the scope of the invention claimed. For example, the splice closure of this invention is equally applicable to underground installations as to the above ground installations illustrated.

We claim:

1. A reenterable splice closure comprising:
   an upper rigid metallic housing member having one closed end and one open end,
   a lower rigid metallic housing member open at its ends and adapted to mate with the open end of said upper housing member,
   said upper and lower housing members located in end to end mating position and defining a seam therebetween,
   a collar of rigid metal telescopically positioned within the mating ends of said housing members and overlapping the seam between said upper and lower housing members,
   a molded cup of insulating material positioned within said collar and said upper housing member with the cup adjacent its open end covering at least the inside edge of the lower end of said collar,
   said upper housing member, said collar and said molded cup secured together, and
   a first heat shrinkable sleeve surrounding and sealably shrunk down over said seam and extending beyond the lower end of said lower member for heat shrinkage onto an object projecting from the lower end of said lower member.

2. The closure of claim 1 including:
   a second heat shrinkable sleeve for reenclosing the closure after it has been opened by cutting said first sleeve along a line at said seam, opening the closure, reclosing the closure and shrinking said second sleeve down over said first sleeve and closing said cut.

3. The method of forming a reenterable enclosure comprising the steps of:
   assembling a rigid metallic upper member having one closed end and one open end, a rigid metallic support collar and a molded cup of insulating material in telescoping relationship with the collar projecting from the lower end of said upper housing member and the cup adjacent its open end covering at least the inside edge of the lower end of said collar with the bottom portion of the cup projecting up inside the upper housing member;
   securing said upper housing member, said collar and said molded cup together;
   sliding the portion of the collar projecting from said upper housing member into a rigid metallic lower housing member open at its ends and mating one end of said lower housing with the open end of said upper housing member thereby forming an outside seam between the mating ends of said housing members, shrinking onto the mating ends of said housing members and over said seam, one end portion of a first heat shrinkable sleeve to seal said housing members together, and
   projecting the other end portion of said first shrinkable sleeve beyond the lower end of said lower housing member for shrinking down on a cable projecting from said lower end of said lower housing member.

4. The method of forming and applying a reenterable enclosure comprising the steps of:
   assembling a rigid metallic upper member having one closed end and one open end, a rigid metallic support collar and a molded cup of insulating material in telescoping relationship with the collar projecting from the lower end of said upper housing member and the cup adjacent its open end covering at least the inside edge of the lower end of said collar with the bottom portion of the cup projecting up inside the upper housing member;
   securing said upper housing member, said collar and said molded cup together;
   sliding the portion of the collar projecting from said upper housing member into a rigid metallic lower housing member open at its ends and mating one end of said lower housing with the open end of said upper housing member thereby forming an outside seam between the mating ends of said housing members, shrinking onto the mating ends of said housing members and over said seam, one end portion of a first heat shrinkable sleeve to seal said housing members together,
   projecting the other end portion of said first shrinkable sleeve beyond the lower end of said lower housing member for shrinking down on a cable projecting from said lower end of said lower housing member,
   projecting said mated and sealed housings down over a cable to be enclosed, and
   shrinking said other end of said first shrinkable sleeve down onto the cable.

5. The method of forming, applying, reopening, and reclosing a reenterable enclosure comprising the steps of:
   assembling a rigid metallic upper member having one closed end and one open end, a rigid metallic support collar and a molded cup of insulating material in telescoping relationship with the collar projecting from the lower end of said upper housing member and the cup adjacent its open end covering at least the inside edge of the lower end of said collar with the bottom portion of the cup projecting up inside the upper housing member;
   securing said upper housing member, said collar and said molded cup together;
   sliding the portion of the collar projecting from said upper housing member into a rigid metallic lower housing member open at its ends and mating one end of said lower housing with the open end of said upper housing member thereby forming an outside seam between the mating ends of said housing members, shrinking onto the mating ends of said housing members and over said seam, one end portion of a first heat shrinkable sleeve to seal said housing members together, projecting the other end portion of said first shrinkable sleeve beyond the lower end of said lower housing member for shrinking down on a cable projecting from said lower end of said lower housing member, projecting said mated and sealed housings down over a cable to be enclosed, shrinking said other end of said first shrinkable sleeve down onto the cable, cutting said first shrinkable sleeve along said seam, opening said enclosure for operations on the cable thereinside, reassembling said upper housing member and said lower housing member with said support collar telescoping the members at their meeting ends, and shrinking a second heat shrinkable sleeve over the cut of said first heat shrinkable sleeve to reseal said reenterable enclosure.

6. A reenterable splice closure comprising an upper housing member, a lower housing member adapted to mate with said upper member, said housing members having rigid telescoping support means for supporting the mating ends of said upper and lower housing members against inward pressure, and a first heat shrinkable sleeve surrounding and sealably shrunk down over the mating ends of said housing members, said sleeve extending beyond the lower end of said lower member and heat shrinkable onto an object projecting out from the lower end of said lower housing member.

7. The closure of claim 6 wherein at least one of said upper and lower housing members is rigid and said telescoping support means includes a collar overlapping the mating ends of said upper and lower housing members.

8. The closure of claim 7 wherein said collar is integral with one of said housing members.

9. The closure of claim 7 wherein said collar is fixedly secured to one of said housing members.

10. The closure of claim 6 wherein said upper housing member is metallic and including a molded cup of insulating material having its open end covering at least the inside edge of the lower end of said metallic upper housing member or said collar and said molded cup extending upwardly into said upper housing member, said upper housing member, said collar and said molded cup being secured together.

11. The closure of claim 6 including indicia on the outside of said first sleeve over the mating ends of said housing and marking where said sleeve should be cut to reenter the closure.

12. A reentered reenterable splice closure comprising:

an upper housing member, a lower housing member adapted to mate with said upper housing member, said housing members having rigid telescoping support means for supporting the mating ends of said upper and lower housing members against inward pressure, a first heat shrinkable sleeve surrounding and sealably shrunk down over the mating ends of said housing and later cut along said mating ends of said housing members for reentry of said reenterable splice closure, said first sleeve extending beyond the lower end of said lower member and heat shrinkable onto an object projecting out from lower end of said lower housing member, and a second heat shrinkable sleeve for shrinking down over and sealing the mating ends of said housing members at the cut in said first heat shrinkable sleeve.

13. A reenterable splice closure comprising a tubular upper housing member having one closed end and one open end, a tubular lower housing member open at its ends and adapted to mate with the open end of said upper member, said housing members having rigid telescoping support means for defining an outside seam between said upper and lower members and supporting said seam against inward pressure, a first heat shrinkable sleeve surrounding and sealably shrunk down over said seam, said first shirnkable sleeve extending beyond the lower end of said lower housing member and heat shrinkable onto an object projecting out from the lower end of said lower housing member.

14. The closure of claim 13 wherein at least one of said upper and lower housing members is rigid metal and said telescoping support means includes a collar overlapping said seam.

15. The closure of claim 14 wherein said collar is integral with one of said housing members.

16. The closure of claim 14 wherein said collar is fixedly secured to one of said housing members.

17. The closure of claim 14 wherein said upper housing member is rigid metal and including a molded cup of insulating material having its open end covering at least the inside exposed edge of the lower end of said metallic upper housing member or said collar and said molded cup extending upwardly into said upper housing member.

18. The closure of claim 14 including indicia on the outside of said sleeve over said seam and marking where said sleeve should be cut to reenter the closure.

19. A reentered reenterable splice closure comprising:

a tubular upper housing member having one closed end and one open end, a tubular lower housing member open at its ends and adapted to mate with the upper end of said upper member, said housing members having rigid telescoping support means for defining an outside seam between said upper and lower members and supporting said seam against inward pressure, at least one of said upper and lower housing members being of rigid metal, said telescoping support means including a collar overlapping said seam, a first heat shrinkable sleeve surrounding and sealably shrunk down over said seam and cut along said seam for reentry of the closure, said first shrinkable sleeve extending beyond the lower end of said lower housing member and heat shrunk onto an object projecting out from the lower end of said lower housing member, and a second heat shrinkable sleeve for shrinking down over and sealing the cut of said first shrinkable sleeve.

20. A reenterable and reclosable splice closure comprising:

an upper housing member having one closed end and one open end, a lower housing member open at its ends and adapted to mate with the open end of said upper housing member, at least one of said housing members formed of rigid metal, said upper and lower housing members located in end to end mating position and defining a seam therebetween, a collar of rigid metal overlapping the seam between said upper and lower housing members, a first heat shrinkable sleeve surrounding and sealably shrunk down over said seam and extending beyond the lower end of said lower member for heat shrinkage onto an object projecting from the lower end of said lower member, and a second heat shrinkable sleeve for reenclosing the closure after it has been opened by cutting said first sleeve along a line at said seam opening the closure, reentering the closure, reclosing the closure and shrinking said second sleeve down over said first sleeve and closing said cut.

21. The closure of claim 20 including a molded cup of insulating material, said upper housing member, said collar and said molded cup secured together, said molded cup adjacent its open end covering at least the inside edge of the lowest end of said collar.

22. The method of forming a reenterable enclosure comprising the steps of:

assembling an upper housing member and a lower housing member with a support collar telescoping the members at their meeting ends, said upper housing member having one closed end and one open end, said lower housing member open at its ends, one of which is adapted to mate with the open end of said upper housing member, at least the support collar and one of said housing members being of rigid metal, shrinking onto the mating ends of said housing members and over the telescoping support collar one end portion of a first heat shrinkable sleeve to seal said housing members together, and projecting the other end portion of said sleeve beyond the lower end of said lower housing member for shrinking down on a cable projecting from said lower end of said lower housing member.

23. The method of forming and applying a reenterable enclosure comprising the steps of:

assembling an upper housing member and a lower housing member with a support collar telescoping the members at their mating ends, said upper housing member having one closed end and one open end, said lower housing member open at its ends, one of which is adapted to mate with the open end of said upper housing member, at least the support collar and one of said housing members being of rigid metal, shrinking onto the mating ends of said housing members and over the telescoping support collar one end portion of a first heat shrinkable sleeve to seal said housing members together, projecting said mated and sealed housing members down over a cable to be enclosed and shrinking said other end of said first shrinkable sleeve down onto the cable.

24. The method of forming, applying, reentering and resealing a reenterable enclosure comprising the steps of:

assembling an upper housing member and a lower housing member with a support collar telescoping the members at their mating ends, said upper housing member having one closed end and one open end, said lower housing member open at its ends, one of which is adapted to mate with the open end of said upper housing member, at least the support collar and one of said housing members being of rigid metal, shrinking onto the mating ends of said housing members and over the telescoping support collar one end portion of a first heat shrinkable sleeve to seal said housing members together, projecting said mated and sealed housing members down over a cable to be enclosed, shrinking said other end of said first shrinkable sleeve down onto the cable, cutting said sleeve along a line at said mating ends of said housing members, opening said enclosure for operations on the cable thereinside, reassembling said upper housing member and said lower housing member with said support collar telescoping the members at their meeting ends, and shrinking a second heat shrinkable sleeve over of said first cut heat shrinkable sleeve to reseal said reenterable enclosure.

* * * * *